United States Patent
Umino et al.

(10) Patent No.: US 7,550,178 B2
(45) Date of Patent: Jun. 23, 2009

(54) METHOD OF DYEING OR REFORMING INJECTION, BLOW OR COMPRESSION MOLDING

(75) Inventors: Yuuji Umino, Fukushima (JP); Hirofumi Tateyama, Fukushima (JP)

(73) Assignee: Munekata Co., Ltd., Fukushima-Ken (JP)

( * ) Notice: Subject to any disclaimer, the term of this patent is extended or adjusted under 35 U.S.C. 154(b) by 750 days.

(21) Appl. No.: 11/113,892

(22) Filed: Apr. 25, 2005

(65) Prior Publication Data

US 2006/0237876 A1  Oct. 26, 2006

(51) Int. Cl.
  *H05H 1/24*  (2006.01)
  *B29C 45/34*  (2006.01)
(52) U.S. Cl. .................. 427/248.1; 264/320; 264/328.1
(58) Field of Classification Search ....................... None
  See application file for complete search history.

(56) References Cited

U.S. PATENT DOCUMENTS 5,118,455 A * 6/1992 Loren ......................... 264/40.3
5,753,174 A * 5/1998 Shimizu et al. ............. 264/513
6,821,476 B2 * 11/2004 McClelland et al. ......... 264/572
2001/0043990 A1 * 11/2001 Chong et al. ................. 427/320
2003/0228485 A1 * 12/2003 Yusa et al. .................. 428/577

FOREIGN PATENT DOCUMENTS

| JP | 6-81277 | 3/1994 |
| JP | 8-506612 | 7/1998 |
| JP | 2001-226884 | 8/2001 |

* cited by examiner

*Primary Examiner*—Timothy H Meeks
*Assistant Examiner*—Joseph Miller, Jr.
(74) *Attorney, Agent, or Firm*—McGlew and Tuttle, P.C.

(57) ABSTRACT

A molding method providing a homogeneous surface without any patch by dyeing or reforming a resin surface in a die concurrently to molding, in injection-, blow-, or compression molding, after thermoplastic resin is filled in a die cavity. After blow-molding, or after compression molding, mixture gas of carbon dioxide gas and a dye, or mixture gas of carbon dioxide gas and a reformer is injected between the resin and the die for forming a clearance, and pressure of the mixture gas is kept at a constant level. The mixture gas is dissolved in a molded surface, and a pressure is applied to contact the molded surface to the cavity face. The mixture gas in the clearance is exhausted and cooled, and the molded product is taken out. A dye-permeated layer or a reformer-permeated layer is formed on a surface of the molded product.

2 Claims, 5 Drawing Sheets

METHOD OF DYEING OR REFORMING INJECTION, BLOW OR COMPRESSION MOLDING

BACKGROUND OF THE INVENTION

1. Field of the Invention

The present invention relates to a method of dyeing or reforming a surface of a plastic injection molding, including an injection compression or injection press molding, blow molding or compression molding; more specifically, this inventions relates to a method of dyeing or reforming a molding surface inside a mold for injection, blow or compression molding.

2. Description of the Related Art

In a method of coating with paint or reformer to dye or reform the plastic molding surface, there exist problems in terms of anti-wearing characteristic, cost and the like; and when this coating is applied, there are concerns about a work environment as well as an environmental problem which occurs after the molding becomes a waste, because an organic solvent is used in general.

Therefore there has been a request for technological proposals for dyeing or reforming the molding surface without using the organic solvent; at present the following technologies are disclosed, though there are only a few of them.

Japanese Patent Laid-Open Publication No. 2001-226884 (Patent Document 1)

Patent Document 1 is directed to a non-aqueous dyeing method for such materials as a resin molding, rubber molding and fiber, with a dye conducted in supercritical carbon dioxide; and this invention relates to, in the non-aqueous method of dyeing a material in the supercritical carbon dioxide, a dyeing method with supercritical dye liquor made from supercritical carbon dioxide and co-solvent thereof; and a dyeing material is any one of the resin molding, rubber molding or fiber. The co-solvent of the supercritical carbon dioxide is compound liquid mixed with one or more than one kind of water or polar organic solvent; the amount of the co-solvent accounts for 0.01~10% of the supercritical carbon dioxide. The invention relates to a non-aqueous dyeing method of dyeing in the compound liquid of water, polar organic solvent alcohol or dimethylformamido, mixed with the supercritical carbon dioxide. This invention, however, is used with an autoclave for dyeing, therefore it takes time to carry a material to be treated into or out of the autoclave. Because the autoclave consumes a large amount of dye, it leads to a waste of money; also it is necessary to keep the autoclave at high pressures and high temperatures, which results in a large amount of energy consumption.

Japanese Patent Laid-Open Publication No. H6-081277 (Patent Document 2)

Patent Document 2 relates to a method which doesn't involve such troublesome work as creating vacuum atmosphere; in which it is possible to dye on both sides of chromatic optical components, and it is possible to dye at high concentrations over the relatively low heating temperature during a short period of time; and the invention relates to a method in which optical components stained with mixed color can be easily manufactured; and in which optical components and powdery resin dyeing agents are heated with both of which contacted with each other; the optical components and the powdery resin dyeing agents are placed inside a closed vessel to enable homogeneous contact between the optical components and the resin dyeing agents; and a method of heating and dyeing while adding such motion as rotation.

However, in this method the dyeing agents don't permeate into the dyed components, but dyeing layers are only formed on the surface; therefore it is unsuitable for a molding on which such problems as peeling may occur or friction is likely to develop.

Published Japanese translations of PCT international patent publication No. H 8-506612 (Patent Document 3)

Patent Document 3 provides a method of impregnating a various kinds of polymer carriers with impregnant, and a method of simultaneously contacting the polymer carriers, impregnant, carrier liquid and supercritical fluid. The impregnant is practically insoluble in the supercritical fluid, and favorably, a carrier body is practically insoluble in the supercritical fluid.

However, this invention uses liquid as a carrier; this liquid is supercritical carbon dioxide; and an autoclave is used. An untreated material is impregnated in the carrier mixed with additives inside the autoclave; and just like the case of Patent Document 1, a large amount of additive is likely to be consumed. The invention also consumes a large quantity of energy in order to keep the autoclave at high pressures and high temperatures.

SUMMARY OF THE INVENTION

The first object of the present invention is to provide a method of conducting dyeing or reforming by efficiently forming dye or reform-permeated layers on the molding surface.

Further, the second object is to provide a dyeing or reforming method of a molding for producing a spotless, high quality dyed or reformed molding at a low cost.

Further the third object is to provide a dyeing or reforming method without using an organic solvent.

Further the fourth object is to provide a dyeing or reforming method of a molding which can freely control dyeing concentration levels or reforming.

In order to accomplish the objects, in the dyeing or reforming method of the injection molding according to the invention, after filling the mold for injection molding with thermal plastic resin, by injecting a mixture gas obtained by mixing a carbon dioxide gas with the dye or reformer between this filled resin and the mold, a mixture gas layer is formed between the resin and the mold; and during this time a dye layer or a reform layer is formed on the surface of the injection molding by forming an permeated layer of the mixture gas on the resin surface.

Further, according to the invention, the infusion of the mixture gas may take place after filling the resin, during or after the pressure keeping, during or after the cooling; which means, during the process before opening the mold.

Further, according to the invention, after filling the mold with the thermal plastic resin, a space may be formed between the resin and the mold by injecting an inactive gas between this filled resin and the mold; and then the inactive gas is replaced by injecting the mixture gas into this space.

Further, in the dyeing or the reforming method of the injection molding according to the invention, a space is formed by conducting minute opening of the mold after the cooling is over; and after injecting the mixture gas obtained by mixing the carbon dioxide gas with the dye or the reformer, this mixture gas pressure is kept at a certain pressure level; and during this time, by forming the osmotic layer of the mixture gas, the dyeing or reforming layer is formed on the surface of the molding.

Further, according to the invention, the inactive gas may be injected into the space formed by conducting the minute opening of the mold, and then the mixture gas is injected into the space to replace the inactive gas.

Further, according to the invention, the mixture gas may be heated at a temperature of more than that of the molding and then injected into the space.

Further, the mold for a blow molding, in the dyeing or reforming method of the blow molding, may be by injecting the carbon dioxide gas and the dye or the reformer or the compound mixture gas thereof between this blow molding and the mold after blow molding, this mixture gas is permeated onto the molding surface to form a dye permeated layer or reformer permeated layer on the molding surface; and then the mold is opened.

Further, in the mold for the compression molding according to the invention, by injecting the carbon dioxide gas and the dye or the reformer or the compound mixture gas thereof between this compression molding and the mold after compression molding, this mixture gas is permeated onto the molding surface to form a dye permeated layer or reformer permeated layer on the molding surface; and then the mold is opened.

Further, according to the invention a reformer, a reactive monomer, organic power, inorganic powder, conductive powder or antistatic agent by itself or together with some of the others may be used.

Further, the dye layer, the reformer layer or the compound thereof may be formed on all or a part of a visual face of the molding, or on all or a part of an invisible face of the molding.

Further, dyeing or reforming many times on the dye permeated layer, the reformer permeated layer or the compound layer thereof, once formed.

Because the compound gas means a mixture gas or a compound mixture gas consisting of the carbon dioxide gas and the dye or (and) the reformer, the carbon dioxide gas softens the resin surface, and applies the pressure thereon; and therefore the dye or the reformer permeates into the resin, forming the colored permeated layer or the reformer permeated layer on the resin surface. The dye concentration and the reforming level of this colored permeated layer or reformer layer can be controlled freely by changing a blend ratio or a permeation depth and the like of the dye or the reformer. This dyeing or reforming can be applied just once; however, the dyeing or the reforming can be applied on top of the other twice or more than twice, using the same material or the other material.

The effects of the present invention include the following:
1. The dyed or reformed permeated layer is formed on the molding surface, improving anti-wearing and anti-peeling properties.
2. Because the dyeing or the reforming takes place inside the mold for the molding, there is no special need for an autoclave or a pressure vessel. Therefore, there is no need for carrying in and out the molding, which improves productivity.
3. Because no pressure device or heating device is installed, a small amount of energy is consumed, contributing to energy conservation.
4. No organic agent is used, contributing to the conservation of the work environment and the natural environment.
5. The depth of the dye permeated layer or reformer permeated layer can be freely adjusted with pressure and time control; for example, by deepening the dye permeated layer, a deep color can appear; by shallowing it, a faint color can appear.

DESCRIPTION OF THE PREFERRED EMBODIMENTS

In the dyeing or reforming method of the present invention, according to Claim 1, after filling a mold with a thermal plastic resin, a mixture gas of a carbon dioxide gas and a dye which can soften a resin surface, or a mixture gas of the carbon dioxide gas and the reformer is injected between the resin and the mold, to form a space and dissolve the mixture gas on the resin surface.

This mixture gas can be injected any time during or after pressure keeping, or during cooling or after the cooling is over.

Or after the completion of the filling, pressure keeping and cooling steps of the resin, the mold is opened minutely to form a space; and then the mixture gas is injected into the space; and then the gas pressure in the space is kept constant; and then the mixture gas is dissolved on the resin surface. After each of the mixture gases is dissolved on the resin surface, a remaining surplus gas not dissolved in the space is discharged; and then a compact is taken out. As the steps before injecting the compound mixture into the space, an inactive gas is injected into the space to keep the pressure inside the space constant. Next, the mixture gas which has been kept at a pressure higher than that of the inactive gas inside the space is injected to replace with the inactive gas.

The object of injecting and replacing this inactive gas is to prevent the dye, the reformer or the like from separating or separating out from the $CO_2$ due to a pressure fall, because when the mixture gas is injected into a mold cavity and an injection line, the gas is suddenly discharged from a mixture gas generator with a high air pressure to a space with a low air pressure.

Therefore, in advance the inactive gas with an air pressure lower than that of the mixture gas is injected into the mold cavity and the injection line, and then the mixture gas is injected to replace it, so that a change in the air pressure can be reduced. As a result a concentration of the mixture gas can be kept more stably.

The desirable difference in air pressures between the inactive gas and the mixture gas is in the range from 3 to 5 MPa.

In the invention, after the mixture gas is dissolved in a surface of resin, surplus mixture gas not having been dissolved in the resin surface and remaining in the cavity is exhausted to the outside and then the molded product is taken out.

With the present invention, a pressure drop occurring between the injection line into the die cavity can be reduced, and a density of the mixture gas injected into the die cavity can be maintained in the more stable state.

As described above, immediately after the resin is filled in, or after the dies are opened a little, by injecting the mixture gas for forming a clearance and then performing molding, reformation dyeing or giving functionality to the resin surface becomes possible, which insures formation of a homogeneous surface without any patch.

The thermoplastic resin available for a material to provided a molded product according to the present invention includes, a styrene-based resin (such as polyethylene, butadiene-styrene copolymer, acrylic nitrile-styrene copolymer, acrylic nitrile-butadiene-styrene copolymer), ABS resin, polyethylene, polypropylene, ethylene-propylene resin, ethylene-ethylacrylate resin, polyvinyl chloride, polybutene, polycarbonate, polyacetal, polyphenilene oxide, polyvinyl alcohol, polymethyl methacrylate, saturated polyester resin (such as polyethylene telephthalate, and polybutylene telephthalate), biodegradable polyester resin (such as hydroxycarboxylic acid condensate such as polylactic acid, condensate of diol and dicarboxylic acid such as polybutylene succinate), polyamide resin, polyimide resin, fluorine resin, polysulphon, polyether sulphon, polyallylate, polyether etherketone, mixture of one or more types of liquid crystal polymers, and resin with various types of inorganic or organic fillers mixed therein. Of these thermoplastic resins, polycarbonate, polymetacrylate, and polypropylene are especially preferable.

There is no specific restriction over a type of gas used for mixing with a dye or a reformer so far as the gas can be dissolved in a resin surface, but carbon dioxide gas or that in the supercritical state having the highest solubility among the materials listed above is preferable.

As the inactive gas to be previously injected into the clearance in the present invention, carbon dioxide, argon, helium, nitrogen, or oxygen, each of which has no possibility of burning other solvent (incombustibility), is not present in the environment harmfully and not odorous, and is chemically inactive, may be used.

There is no specific restriction over a dye or a reformer used in the present invention, and any of the organic powder, inorganic powder, conductive powder, an antistatic agent, and a reactive monomer may be used for the purpose on the condition that the material can give to a resin surface such functionality as dyeing, abrasion resistance, conductivity, hardness, brightness, adaptability to being coated, spectral characteristics, and anti-static effect. More specifically, a dye used for dyeing a resin surface and giving the spectral characteristics in the present invention includes, but not limited to, organic powder such as nitro dye, methane dye, quinoline dye, aminonaphthoquinone dye, coumarin dye, and preferably anthraquinone dye, tricyanovinyl dye, azo dye, dinitrophenyl amine, any combination thereof and inorganic powder such as silver white, ivory black, peach black, lamp black, carbon black, and any combination thereof Further the reformer used for recording a resin surface and giving thereto functionality such as high brightness, abrasion resistance, and surface hardness in the present invention includes inorganic powder such as mica titanium, titanium oxide, gold powder, and calcium carbonate, and fluorine powder. Further as a reformer for coating a resin surface and giving conductivity thereto, powder obtained by coating any material selected from the group consisting of zinc powder, silver powder, nickel powder, mica, sericite and a combination thereof with conductive metal may be used in the present invention. Further as a reformer for realizing elasticity or other various functions such as chemical resistance on a resin surface by causing binding with the resin surface or a bringing reaction therewith, any material selected from the groups consisting of protein, polypeptide, nucleotide, drug, or acrylic acid, ethylene, styrene, isobutyl vinyl ether, methyl acetate, vinyl chloride, propylene, amino acid ester, a reactive monomer such as polyphenol and silicone, and a combination thereof may be used in the present invention. As an anti-static agent, any material selected from the group consisting of a water-soluble surfactant, polyoxyalkylene ether, polyoxyethylene derivative, sorbitan fatty acid ester, intermediate purity monoglyceride steam, polyethylene glycol stearate, and a combination thereof may be used in the present invention. Further a combination of the organic powder with either one of inorganic powder and an anti-static agent may be used as a reformer in the present invention.

Examples of and comparative examples for the present invention is described in detail below with reference to drawings, but the present invention is not limited to the examples, and any combination of the example is also included within a scope of the present invention.

EXAMPLE 1

An embodiment of the invention is described below with reference to FIG. 1 and FIG. 2.

Figure 1:
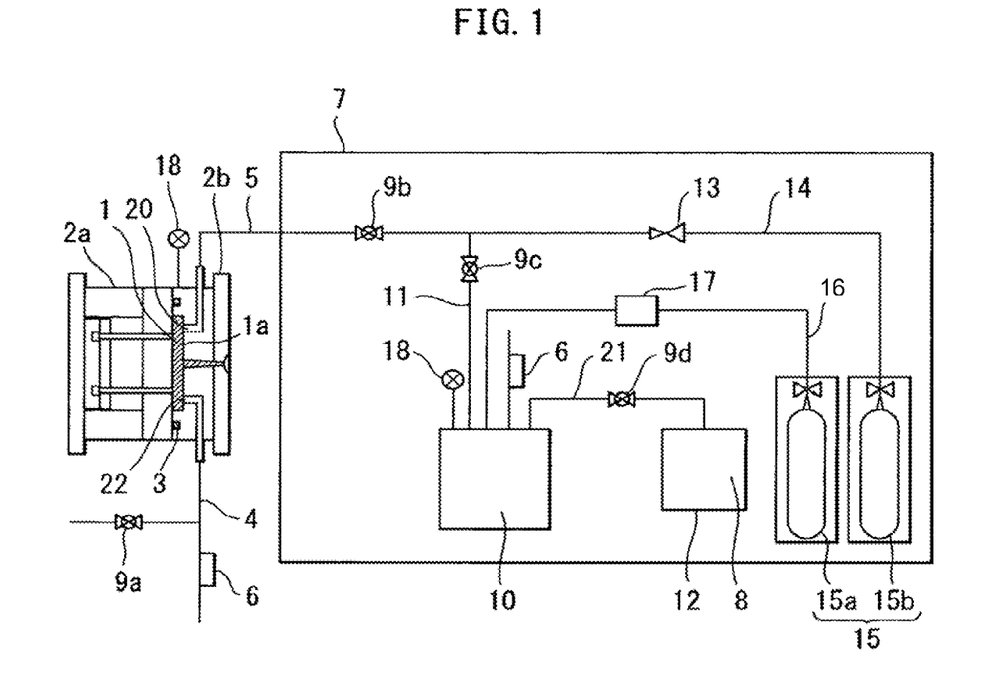
FIG. 1 is an explanatory view showing a gas injection device and a mold to implement the present invention.

FIG. 1 shows a die and an injector employed for carrying out the present invention. The reference numeral 1 indicates a cavity formed when a die 2b in the fixed side and a die 2a in the movable side are tightened to each other; the reference numeral 3 indicates a O-ring for preserving a gas pressure in the cavity and preventing leakage of gas to outside of the cavity; the reference numerals 9a, 9b, 9c, 9d indicates electromagnetic switching control value for controlling; reference numeral 18 indicates a pressure gauge; and the reference numeral 6 indicates a back pressure valve for exhausting a gas to the outside only when a gas pressure in the cavity or in each vessel is not less than a prespecified pressure level. Further the reference numeral 4 indicates a gas exhaust line connected the back pressure value to a gas exhaust port 22 for exhausting a gas inside the cavity 1 to the outside. A surplus mixture gas carbon of dioxide and dye (dyeing material) or a reformer is exhausted to the outside through this exhaust line 4.

The reference numeral 7 indicates a gas injector, and in this gas injector 7, the reference numeral 15a indicates a gas bomber with carbon dioxide gas filled therein, and the reference numeral 15b indicates a gas bomber 15b with in active gas filled therein. This gas bomber 15 and the die 2a in the movable side are connected to each other with a gas injection line 5 connected to one, two or more gas inlet 20 formed on a cavity face 1a in the visible face side. This gas injection line 5 branches to two branch lines, namely an inactive gas injection line 14 and a mixture gas injection line 11 for injection a mixture gas of carbon dioxide and a dye or a reformer, and the inactive gas injection line 14 connects a gas pressure adjuster 13 to the electromagnetic switching control valve 9b, and the other injection line, namely the mixture gas injection line 11 is connected to a mixture gas generating vessel 10 for mixing a carbon dioxide gas with a dye or a reformer 8 and preserving the mixture gas in the pressurized state, and the two lines are connected to each other via the electromagnetic switching control value 9c.

Further a reformer pressure feed pump 12 and the electromagnetic switching control valve 9d are connected to each other with an reformer injection line 21 to the mixture gas generating vessel 10 for exhausting a reformer 8 to the mixture gas generating vessel 10 in the constant state so that the dissolving densities of the carbon dioxide gas and the reformer 8 in the mixture gas generating vessel 10 are stabilized. Further a carbon dioxide gas injection line 16 connecting the mixture gas generating vessel 10 to the gas bomber 15a with carbon dioxide gas filled therein comprises a gas warmer 17 for adjusting temperature of the carbon dioxide gas in the mixture gas generating vessel 10 so that the gas temperature is always kept at a level best suited to mixing the carbon dioxide gas with a dye or a reformer.

The injection molding method according to the present invention is described below with reference to FIGS. 2A, 2B, 2C, and 2D.

The gas injection 7 shown in FIG. 1 is developed by the applicant and the injection molding machine employed in this invention is a molding machine with the die tightening pressure of 220 torr (produced by Nihon Seiko K.K.: J220E2-P-2M). The experiment was conducted using azo disperse dye (produced by Sumitomo Kagaku Kogyo K.K.: Sumikaron Blue E-FBL) as organic powder and inorganic powder of carbon black (produced by Mitsubishi Kagaku K.K.: Die black N5505M) and a zinc powder of conductive material (produced by Hakusui Tech. K.K.; R powder) each as a reformer. Polycarbonate (produced by Mitsubishi Engineering Plastics K.K.: H3000) was used as a resin. The molded produced obtained in the experiment is a flat body with the dimensions of 32 mm (length), 32 mm (width), and 2 mm (thickness). This molded product was filled in the die cavity 1 (made of material 545 C, bushing type) with the injection pressure of 56 MPa, filling time of 0.5 sec, and melted resin temperature of 280° C. by using pressurized hot water.

Figure 2A:
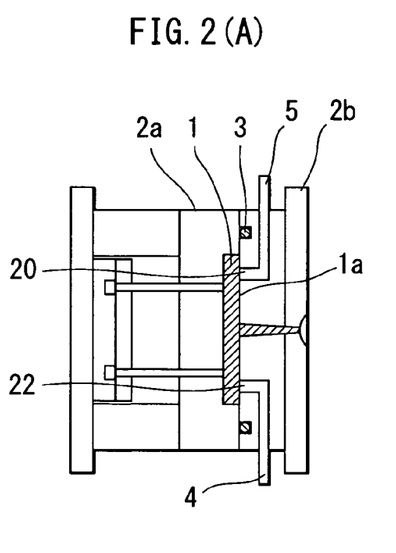
FIGS. 2(A), 2(B), 2(C) and 2(D) are explanatory views showing an example of forming space with gas injection pressure relating to the present invention.
Figure 2B:
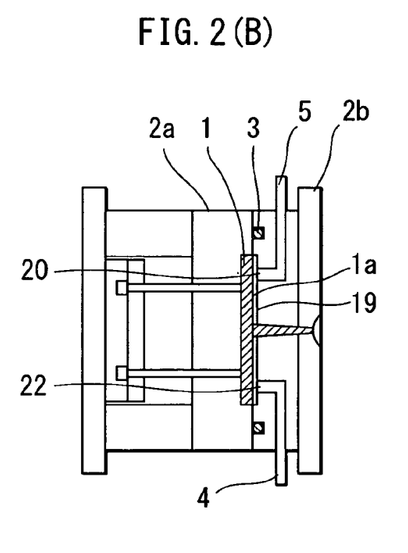

After the melted resin was filled, as shown in FIG. 2B, any of a mixture gas of carbon dioxide gas and organic azo disperse dye, a mixture gas of carbon dioxide gas and carbon black, and a mixture gas of carbon dioxide gas and zinc powder was injected with the gas injection through the gas injection port 5 with the pressure of 15 MPa, the gas temperature of 70° C., and injection time of 2 seconds onto a skin face as well as to the cavity face 1a contacting the skin face, and further the gas pressure in the space was kept at a constant level.

Figure 2C:
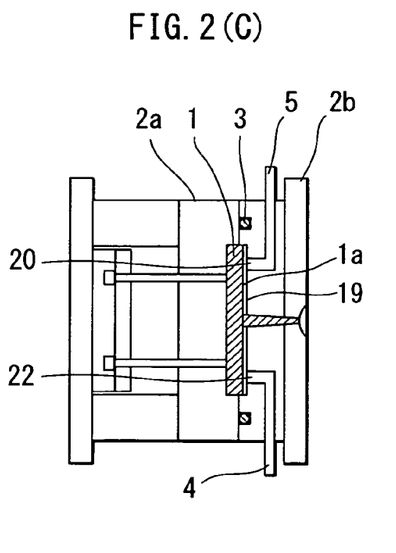
Figure 2D:
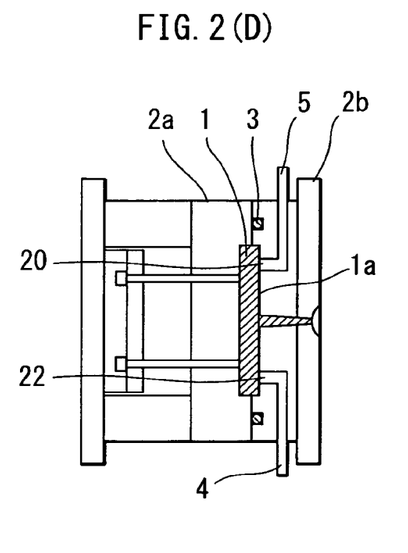

Then the gas was pressurized with a pressure of 90 MPa for 5 seconds to compress the space 19 and molding was performed in the pressurized state by dissolving the mixture gas in the skin face and softening the skin face (FIG. 2(C). Then the mixture gas stored in the die cavity 1 was exhausted (FIG. 2 (D)). Then the mixture gas of carbon dioxide and an organic azo disperse dye, mixture gas of carbon dioxide and carbon black, mixture gas of carbon dioxide and zinc powder and the like not having been dissolved in the skin layer was exhausted through the reverse route to that for injection to the electromagnetic switching control valve 9a side.

Any of the obtained colored and reformed molded products had no patch on a surface thereof, and a result of visual check and sensory assessment is shown in Table 1. In this table, O indicates that no patch is present, Δ indicates that a few patches are present. A cross section of each product was observed with a CCD camera zoom lens (produced by K.K Keyence; VH-Z150), and degrees of dyeing and reformation were assessed.

EXAMPLE 2

Molding was performed by changing the conditions for gas injection employed in Example 1 such as a temperature of a mixture of carbon dioxide and an organic azo disperse dye, time for injection, and an injection pressure. In Example 2, the gas temperature was set to 50, 60, and 70° C., the gas injection time was set to 0.5, 1.0 and 2.0 seconds, and the injection pressure was set to 5, 10, and 15 MPa. The molded products obtained as described above were substantially influenced by a temperature of the mixed gas, injection pressure, and injection time, and with any of the parameters described above, the higher temperature, highest pressure, and longest injection time provided molded products excellently colored and reformed. A cross section of each product was observed with a CCD camera zoom lens (produced by K.K Keyence; VH-Z150), and degrees of dyeing and reformation were assessed. A result is shown in Table 2.

COMPARATIVE EXAMPLE 1

In the method of injecting mixture gas of carbon dioxide gas and an organic azo disperse dye employed in Example 1, the injection time was fixed to 2.0 seconds with the injection pressure to 15 MPa, and the gas temperature was set to 20, 30, 40° C. to perform molding. The temperature in the die cavity 1 was fixed to 70° C. The gas temperature was set to 70° C. or more, namely to 80, 90, and 100° C., but the degree of dyeing did not substantially change from that at 70° C., so that substantially same dyeing degree was provided at each of the gas temperatures. As a result, it was confirmed that the obtained molded products were not colored at all as compared to the molded products obtained in Example 2. A result of visual check and sensory assessment of the surfaces of the molded products is shown in Table 2. A cross section of each product was observed with a CCD camera zoom lens (produced by K.K Keyence; VH-Z150), and degrees of dyeing and reformation were assessed.

COMPARATIVE EXAMPLE 2

In the method of injecting the mixture gas of carbon dioxide gas and an organic azo disperse dye employed in Example 2, the gas temperature was fixed to 70° C., the injection pressure was fixed to 15 MPa, and further the gas injection time was set to 0.1 and 0.3 seconds to carry out molding. Further the temperature in the die cavity 1 was fixed to 70° C. As a result, it was confirmed that the obtained molded products were not colored at all as compared to those obtained in Example 2. A result of visual check and sensory assessment for the product surfaces is shown in Table 2. A cross section of each product was observed with a CCD camera zoom lens (produced by K.K Keyence; VH-Z150), and degrees of dyeing and reformation were assessed.

EXAMPLE 3

FIG. 3A to FIG. 3D correspond to the invention according to, and polycarbonate (produced by Mitsubishi Engineering Plastic K. K.: H3000) as resin. The molded product obtained in this step has the size of 32.00 mm (length), 32.0 mm (width), and 2.0 mm (thickness). Further, this molded product was filled in the die cavity 1 (made 25 from material S45C, bushing type) with pressurized hot water under the conditions of injection pressure of 56 MPa, filing time of 0.5 second, and melted resin temperature of 280° C. In this molding method, immediately after the melted resin was filled, kept in the pressurized state, and cooled, the die 2a in the movable side was retarded to release the die tightening pressure, and a clearance of about 0.1 mm, or in the range from 0.1 mm to 1.0 mm was forcefully formed between the skin layer in the visible side and the cavity face 1a (FIG. 3(A)), and any of the mixture gases employed in Example 1 with the pressure set to 15.0 MPa was kept under the pressure of 15 MPa, and the gas was injected with the gas injector from the gas inlet port 5 into a clearance 19 at the temperature of 70° C. over 30.0 seconds (B).

Figure 3A:
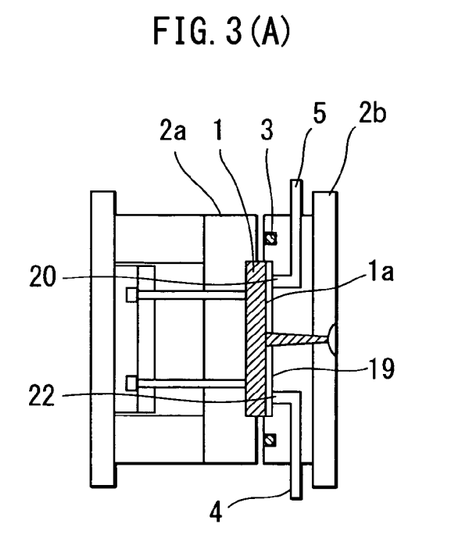
FIGS. 3(A), 3(B), 3(C) and 3(D) are explanatory views showing an example of forming space by pulling back the mold relating to the present invention.
Figure 3B:
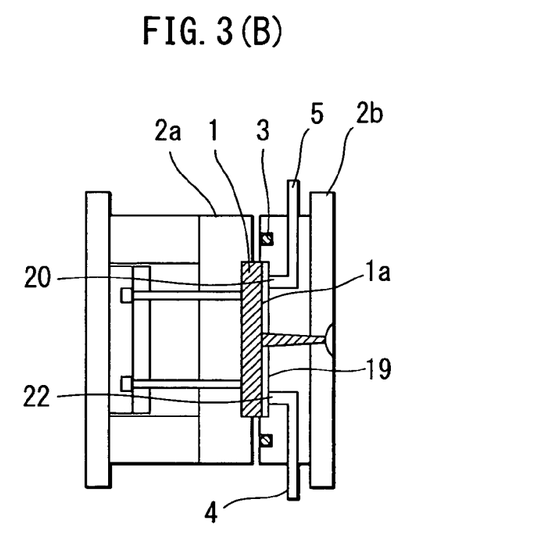
Figure 3C:
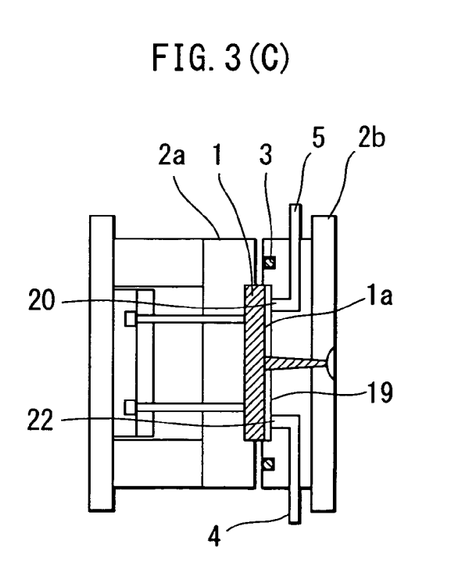
Figure 3D:
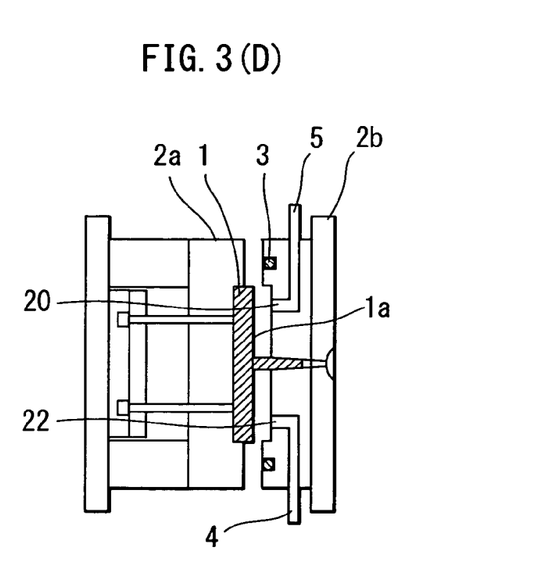

Then the mixture gas was dissolved in the skin layer for softening the skin layer, and then the mixture gas not dissolved in the skin layer and remaining in the clearance was exhausted (FIG. 3(C)). Then the dies were separated and the molded product was taken out (FIG. 3(D)). As a result, each of the obtained molded products did not have any patch. A result of visual check and sensory assessment for the obtained molded products is shown in Table 1. A cross section of each product was observed with a CCD camera zoom lens (produced by K.K Keyence; VH-ZlSO), and degrees of dyeing and reformation were assessed.

EXAMPLE 4

In the gas injection method employed in Example 3, the conditions such as a temperature of mixture gas of carbon dioxide gas and an organic azo disperse dye, injection time. and injection pressure was change to carry out molding. The gas temperature was set to 50, 60, 70° C., the gas injection time was set to 10.0, 20.0 and 30.0 seconds, and the injection pressure was set to 10 and 15 MPa. The obtained molded products were substantially influenced by the gas temperature, pressure, and injection time, and with the parameters described above, the highest temperature, highest pressure and longest injection time provided excellently colored and reformed molded products. A cross section of each product was observed with a CCD camera zoom lens (produced by K.K Keyence; VH-Z150), and degrees of dyeing and reformation were assessed. The result is as shown in Table 2.

COMPARATIVE EXAMPLE 3

In the gas injection method employed in Example 3, after the clearance was formed by slightly opening the dies, the time for injecting a mixture gas of carbon dioxide gas and an organic azo disperse dye was fixed to 2 seconds with the injection pressure fixed to 15 MPa, and molding was performed by changing the gas temperature to 20, 30, and 40° C. The molding was performed at gas temperature of 70° C. or more, namely at 80, 90, and 100° C., but the degrees of dyeing were not different from that at 70° C., and almost the same degrees of dyeing were provided. The obtained molded products were not colored at all. A cross section of each product was observed with a CCD camera zoom lens (produced by K.K Keyence; VH-Z150), and degrees of dyeing and reformation were assessed. The result is as shown in Table 2.

COMPARATIVE EXAMPLE 4

In the gas injection method employed in Example 3, after the clearance was formed by slightly opening the dies, temperature of the mixture gas of carbon dioxide gas and an organic azo disperse dye was fixed to 70° C. with the injection pressure fixed to 15 MPa, and molding was performed by changing the gas injection time to 3.0 seconds and 5.0 seconds. Temperature in the die cavity 1 was fixed to 70° C. As a result, it was confirmed that the obtained molded products had not been colored as compared to those in Example 2. A result of visual check and sensory assessment for the product surfaces is shown in Table 2. Further a cross section of each product was observed with a CCD camera zoom lens (produced by K.K Keyence; VH-Z150), and degrees of dyeing and reformation were assessed.

EXAMPLE 5

FIG. 4 and FIG. 5A to FIG. 5D are directed toward a molding method wherein inactive gas and mixture gas are injected step by step. More specifically, after the molded resin was filled, before start of pressurizing, or after the resin was filled and kept in the pressurized state and then was cooled, the die 2a in the movable side was retarded to release the die tightening pressure, and the clearance 19 of about 0.1 mm, or in the range from 0.1 mm to 1.0 mm was forcefully formed between the skin layer in the visible side and the cavity face 1a, and then the gas with the pressure set to 10 MPa was injected with the gas injector 7 from the gas inlet port 5 for 2 seconds into the clearance 19 (Refer to FIG. 4A and FIG. 5A).

Figure 4A:
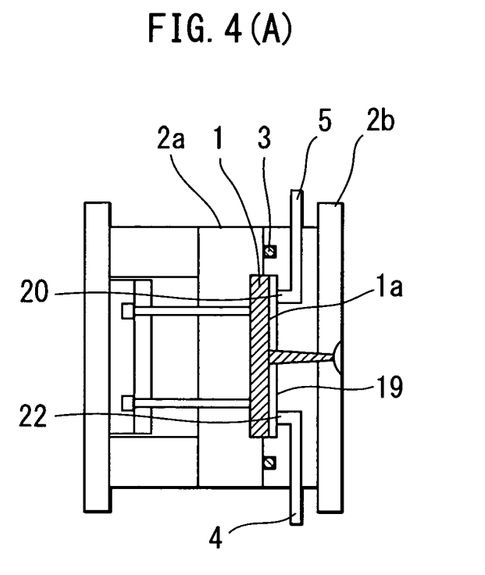
FIGS. 4(A), 4(B), 4(C) and 4(D) are explanatory views showing an example of reforming by injecting an inactive gas into a used multistage, after filling the resin and before the start of pressure keeping.
Figure 4B:
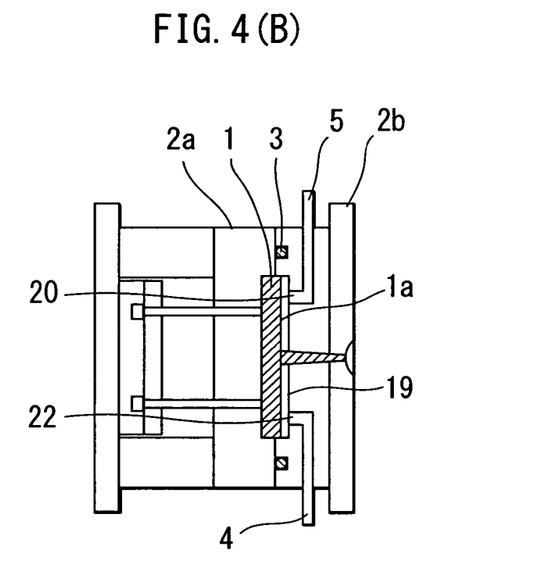
Figure 4C:
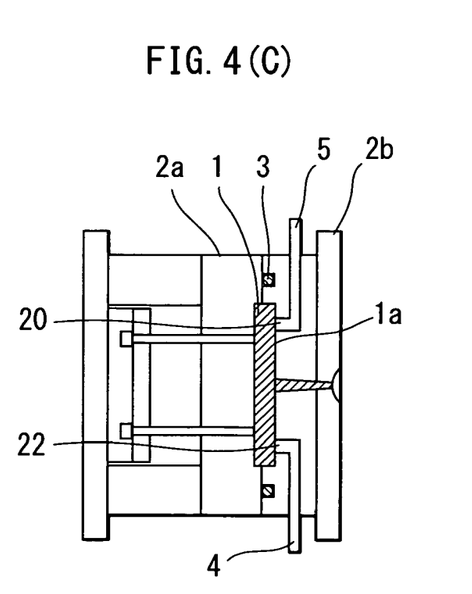
Figure 4D:
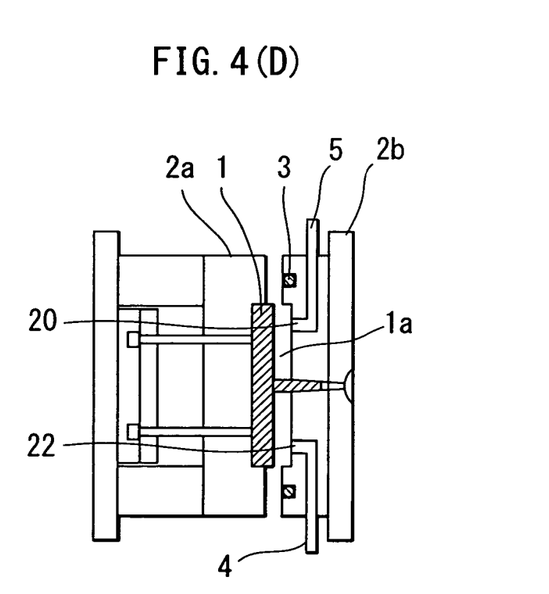
Figure 5A:
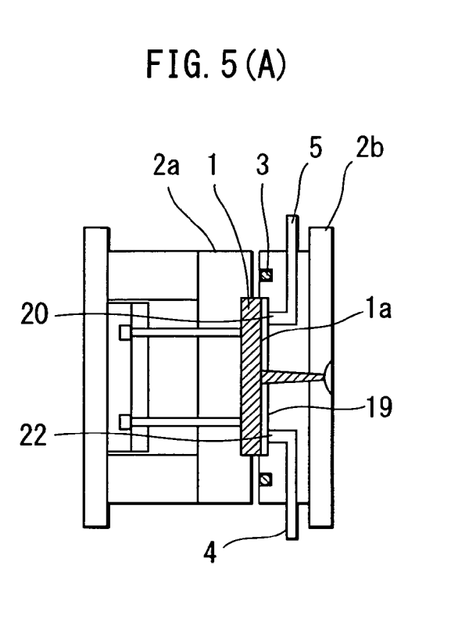
FIGS. 5(A), 5(B), 5(C) and 5(D) are explanatory views showing an example of reforming by injecting an inactive gas into a used multistage, after the completion of the minute opening.
Figure 5B:
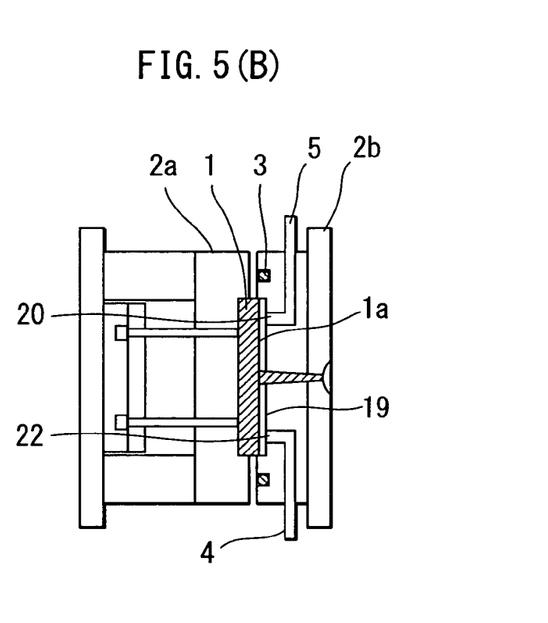
Figure 5C:
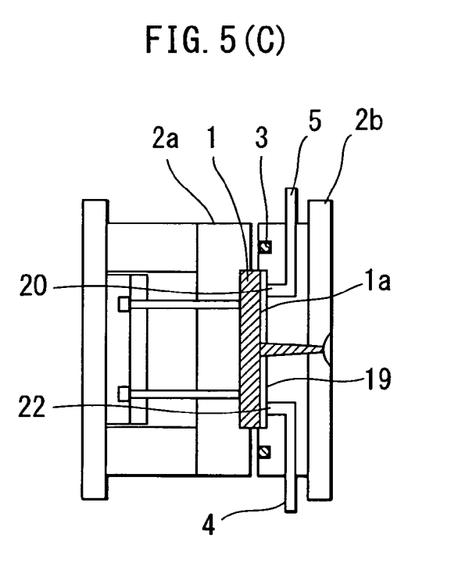

Then the mixture gas with the pressure set to 10 MPa, which is higher than a gas pressure in the clearance 1 and also with the temperature set to 70° C. was injected for 2 seconds in claim 3 and for 30.0 seconds in claim 5 for substitution (Refer to FIG. 4B and FIG. 5B). Then, in claim 3, the mixture gas was kept under the pressure of 90 MPa for 5.0 seconds to dissolve the mixture gas in the skin layer compressing the clearance for softening the skin layer with the skin layer again tightly contacted to the cavity face (FIG. 4C). Then the mixture gas not dissolved in the skin layer and remaining in the clearance was exhausted, and the dies were separated with the molded product taken out (FIG. 4D).

Figure 5D:
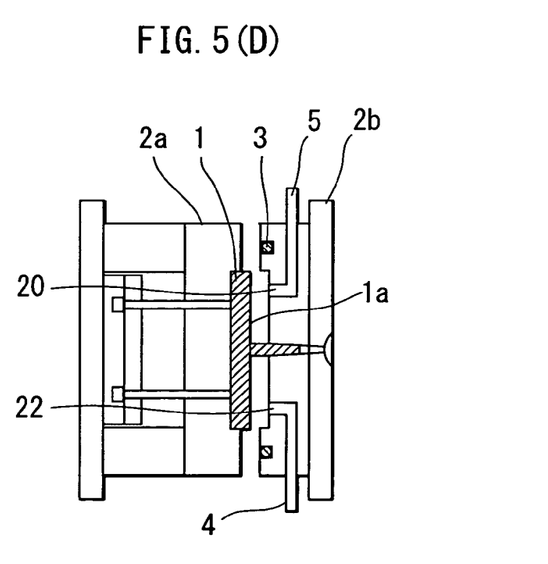

The mixture gas not dissolved in the skin layer and remaining in the clearance was exhausted (FIG. 5C), and then the dies were separated to take out the molded product (FIG. 5D). Any of the obtained products did not have any patch, and a result of visual check and sensory assessment for the molded products is shown in Table 1. Further a cross section of each product was observed with a CCD camera zoom lens (produced by K.K Keyence; VH-Z15O), and degrees of dyeing and reformation were assessed.

TABLE 1

| | Type of gas | Clearance forming method | Type of die or reformer | Gas injection pressure | Gas injection method | State of surface dyeing or reformation | Degree of dyeing or reformation |
|---|---|---|---|---|---|---|---|
| Example 1 | Carbon dioxide | Gas pressure | Organic azo disperse dye | Constant | After resin was filled | ◯ | 17 |
| Example 1 | | Gas pressure | Carbon black | | | Δ | 12 |
| Example 1 | | Gas pressure | Zinc powder | | | Δ | 12 |
| Example 3 | Carbon dioxide | Die in the visible side retarded | Organic azo disperse dye | Constant | After resin was cooled | ◯ | 14 |
| Example 3 | | Die in the visible side retarded | Carbon black | | | Δ | 11 |
| Example 3 | | Die in the visible side retarded | Zinc powder | | | Δ | 10 |
| Example 5 | Carbon dioxide | Gas pressure | Organic azo disperse dye | Step by step | After resin was filled | ◯ | 19 |
| | | Die in the visible side retarded | | | After resin was cooled | ◯ | 14 |
| Example 5 | | Gas pressure | Carbon black | | After resin was filled | Δ | 15 |
| | | Die in the visible side retarded | | | After resin was cooled | Δ | 11 |
| Example 5 | | Gas pressure | Zinc powder | | After resin was filled | Δ | 15 |
| | | Die in the visible side retarded | | | After resin was cooled | Δ | 11 |

◯ No patch
Δ Few patch

TABLE 2

| | Timing for gas injection | Temperature in die cavity 1(° C.) | Gas injection time (S) | Gas temperature (° C.) | Gas pressure (Mpa) | Dyeing depth (μm) |
|---|---|---|---|---|---|---|
| Example 2 | After completion of filling and before start of pressurizing | 70 | 2 | 70 | 15 | 17 |
| | | | 1 | | 10 | 12 |
| | | | 0.5 | | 5 | 11 |
| | | 60 | 2 | 60 | 15 | 14 |
| | | | 1 | | 10 | 10 |
| | | | 0.5 | | 5 | 6 |
| | | 50 | 2 | 50 | 15 | 11 |
| | | | 1 | | 10 | 7 |
| | | | 0.5 | | 5 | 4 |
| Example 4 | After completion of cooling, dies slightly separated | 70 | 30 | 70 | 15 | 14 |
| | | | 20 | | 10 | 10 |
| | | | 10 | | 5 | 8 |
| | | 60 | 30 | 60 | 15 | 11 |
| | | | 20 | | 10 | 7 |
| | | | 10 | | 5 | 5 |
| | | 50 | 30 | 50 | 15 | 7 |
| | | | 20 | | 10 | 4 |
| | | | 10 | | 5 | 3 |
| Comparative example 1 | After completion of filling, and before start of pressurizing | 70 | 2 | 40 | 15 | 0 |
| | | | | 30 | | 0 |
| | | | | 20 | | 0 |
| Comparative example 2 | After completion of filling and before start of pressurizing | 70 | 0.3 | 70 | 15 | 0 |
| | | | 0.1 | | | 0 |
| Comparative example 3 | After completion of cooling, dies slightly separated | 70 | 30 | 40 | 15 | 0 |
| | | | | 30 | | 0 |
| | | | | 20 | | 0 |
| Comparative example 4 | After completion of cooling, dies slightly separated | 70 | 5 | 70 | 15 | 0 |
| | | | 3 | | | 0 |

EXAMPLE 6

Example 6, and in the blow molding, the methods described in Examples 3 to 5 were applied to dyeing and reformation of molded products. The conditions for dyeing and reformation were the same as those employed in Examples 3 to 5, and the same objective could be achieved.

EXAMPLE 7

Example 7, and in the compression molding, the methods described in Examples 3 to 5 were applied for dyeing and reformation of the molded products. The conditions for dyeing and reformation were the same as those employed in Examples 3 to 5, and the same objective could be achieved.

EXAMPLE 8

This example corresponds to a bushing assembled with the die to form a clearance making use of the action of the bushing for the purpose to dye or reform molded products. The conditions employed in this example were the same as those employed in Examples 1 to 7, and the same objective could be achieved.

EXAMPLE 9

In this example, a molded product was once subjected to dyeing or reformation, and then other dye and reformer were permeated under the same conditions, and this overlaid dyeing or reformation is effective when a complicated color is desirable or when performance and functionality of molded products are to be improved with combined effects.

EXAMPLE 10

Although mixture gas of carbon dioxide and a dye or that of carbon dioxide and a reformer is injected after the resin is filled in Example 1, but in this example, the mixture gas was injected in the pressurized state or in the depressurized state, during cooling or after the cooling step was over, and the substantially same result as that in Example 1 was obtained.

EXAMPLE 11

This example corresponds to an anti-static agent used as a reformer under the same conditions as those employed in Example 1. The anti-static agent used in this example was a water-soluble surfactant (produced by Kasuga Dehki K. K.; Jolyzer). When the water-soluble surfactant was mixed therein, an excellent anti-static effect could be obtained. Further products each having not patch on the surface could be obtained. The result is shown in Table 3. Molded products each with the surface subjected to no specific processing and those subjected to the specific processing were rubbed in the same direction 10 times to electrify the products, and then the products were dropped onto powder of carbon black (produced by Mitsubishi Kagaku K. K; Dia-black N550M) with the drop height of 30 mm, and then reducing the drop height by 5 mm. Adhesion of carbon black onto the product surface was visually checked and the distance was measured to assess the anti-static effect.

TABLE 3

| | Molded product | Type of gas | Gas injection method | Type of reformer | | Reformed state | Anti-static effect | Distance allowing for adhesion of carbon powder(mm) |
|---|---|---|---|---|---|---|---|---|
| Example 11 | Not process Processed | Carbon dioxide | After completion of resin filling | Water-soluble surfactant | Constant | — ○ | None Observed | 20 2 |

— No change
○ No patch

The dyeing method according to the present invention may be applied to all produces obtained by injection, brow injection, or compression injection. The molded products reformed according to the present invention by using conductive fine powder can be used as a film or a flat plate for electronic devices in the field of, for instance, electromagnetic shielding. This field is only one example of many fields in which the present invention can advantageously be applied.

What is claimed is:

1. A method of dyeing or reforming an injection-molded product, the method comprising the steps of:
   filling resin into a die via injection molding;
   mixing a dye or a reformer in carbon dioxide gas to form a mixture gas;
   slightly opening said die after a skin layer is formed on a surface of the resin filled in said die such that a clearance is formed between said skin layer and said die;
   injecting an inactive gas into said clearance such that air in said clearance is substituted with said inactive gas;
   closing said die after said mixture gas is injected into said clearance such that said inactive gas is substituted with said mixture gas; and
   keeping said mixture gas in a pressurized state such that said mixture gas penetrates said skin layer to form a dyed layer or a reformed layer on said surface of said skin layer.

2. A method of dyeing or reforming an injection-molded, the method comprising the steps of:
   filling resin into a die via injection molding;
   mixing a dye or a reformer in carbon dioxide gas to form a mixture gas;
   heating said mixture gas to a temperature that is greater than a temperature of said said resin;
   slightly opening said die after a skin layer is formed on a surface of said resin filled in said die such that a clearance is formed between said skin layer and said die;

injecting an inactive gas into said clearance such that air in said clearance is substituted with said inactive gas;

closing said die after said mixture gas is injected into said clearance such that said inactive gas is substituted with said mixture gas; and keeping said mixture gas in a pressurized state such that said mixture gas penetrates said skin layer to form a dyed layer or a reformed layer on said surface of said skin layer.

\* \* \* \* \*